United States Patent [19]

Siegmund

[11] 4,141,624
[45] Feb. 27, 1979

[54] DYNAMIC IMAGE ENHANCEMENT FOR FIBERSCOPES

[75] Inventor: Walter P. Siegmund, Woodstock, Conn.

[73] Assignee: American Optical Corporation, Southbridge, Mass.

[21] Appl. No.: 853,060

[22] Filed: Nov. 21, 1977

[51] Int. Cl.² .............................................. G02B 5/17
[52] U.S. Cl. ...................... 350/96.26; 350/6.2
[58] Field of Search ............... 350/96.24, 96.25, 96.26, 350/6.2, 6.4

[56] References Cited

U.S. PATENT DOCUMENTS

| 3,016,785 | 1/1962 | Kapany | 350/96.25 |
| 3,110,762 | 11/1963 | Frank | 358/25 |
| 3,217,588 | 11/1965 | Chitayat | 350/96.25 |
| 3,217,589 | 11/1965 | Chitayat | 350/96.25 |
| 3,554,632 | 1/1971 | Chitayat | 350/96.25 |
| 3,740,115 | 6/1973 | Cole | 350/96.26 |
| 3,913,568 | 10/1975 | Carpenter | 128/11 |

OTHER PUBLICATIONS

Kapany et al., "Image Transfer on Static and Dynamic Scanning with Fiber Bundles", J.O.S.A., vol. 47, No. 5, May 1957, pp. 423–427.
Kapany, Fiber Optics, Academic Press, New York, 1967, pp. 88–99.

*Primary Examiner*—John K. Corbin
*Assistant Examiner*—John D. Lee
*Attorney, Agent, or Firm*—Jeremiah J. Duggan; H. R. Berkenstock, Jr.

[57] ABSTRACT

A simple and compact image enhancement system for industrial and medical fiberscopes including in each case adjacent each of opposite ends of the fiber bundle of a fiberscope, a plane parallel optical image transmitting plate and means for oscillating the plate about an axis normal to the fiber bundle axis. With one plate transmitting optical images to one end of the fiber bundle and the other plate transmitting the images away from the opposite end of the bundle, ultimate image enhancement and bundle blemish suppression is accomplished by synchronous oscillation of the two plates.

6 Claims, 2 Drawing Figures

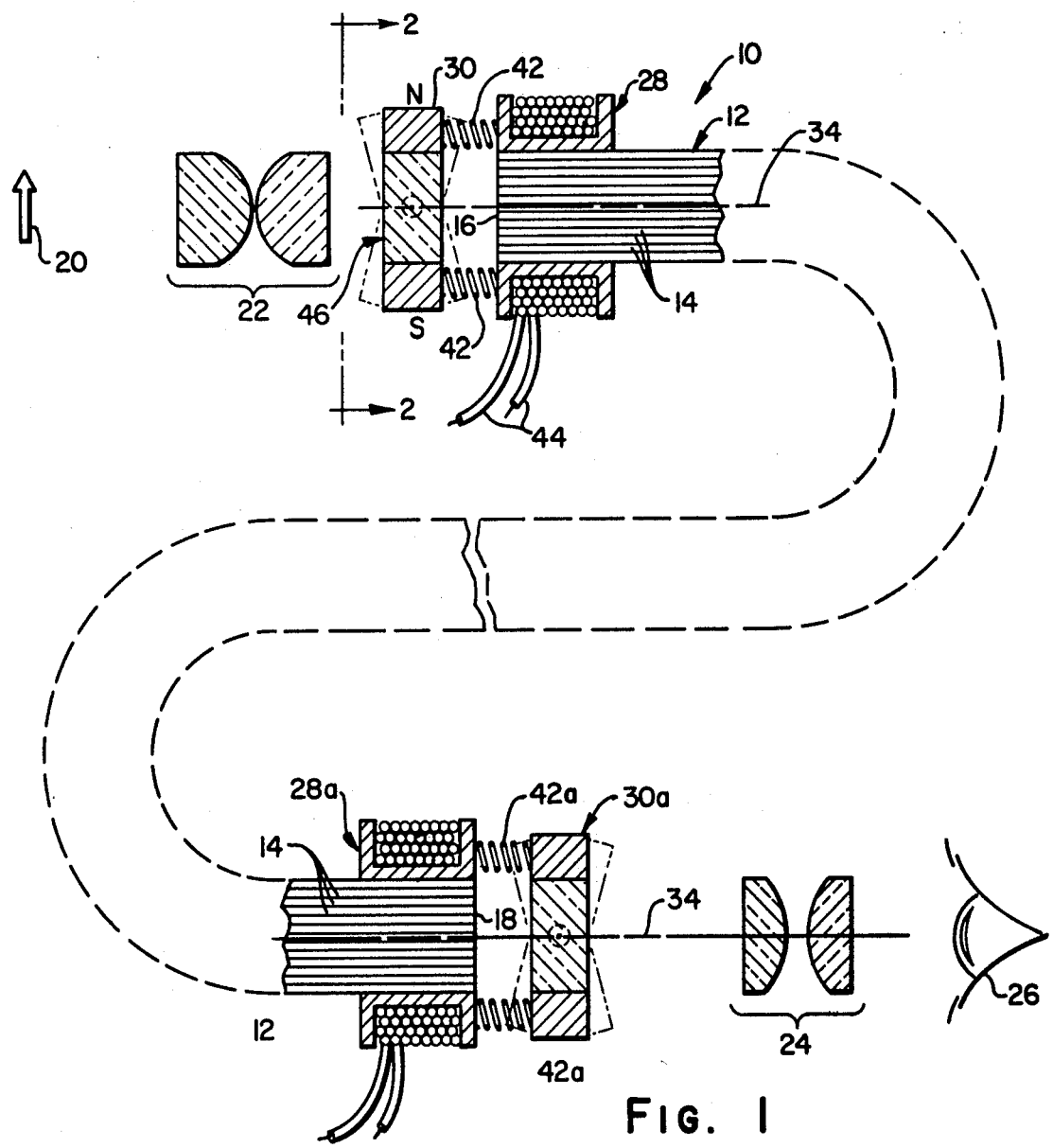
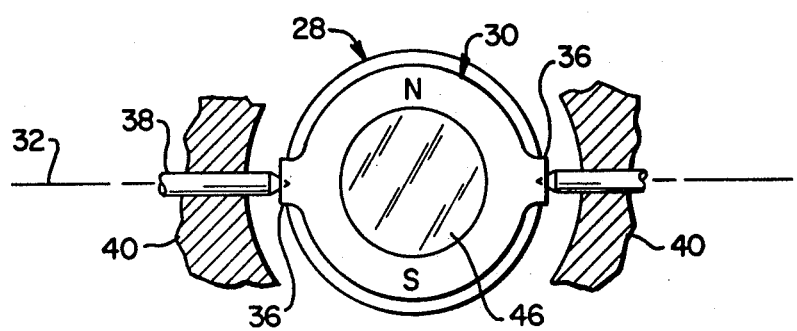
Fig. 1
Fig. 2

DYNAMIC IMAGE ENHANCEMENT FOR FIBERSCOPES

BACKGROUND OF THE INVENTION

1. Field of the Invention

This invention relates to fiber optic image transmitting devices and more particularly to means for enhancing optical images emitted thereby.

2. Description of the Prior Art

Bundles of optical fibers having their corresponding opposite ends arranged in identical geometrical patterns afford image transmitters which conduct image forming light by the well known principles of total internal reflection. The packing tightness and particular mosaic patterning of the fiber ends, their respective diameters and cladding thickness as well as absence or existence of broken fiber cores individually and collectively affect the image resolving power of the bundles whether they are of the rigid or intermediately flexible (fiberscope) type. In particular, the image degrading effects of broken fibers and transmission variations between fibers becomes accumulative in fiberscopes of extra long lengths especially when end-to-end coupling of two or more fiber bundles is necessary to satisfy a length requirement.

As evidence of the recognition in the art that spacings between light-conducting cores and defects of fiber breakage, foreign matter inclusions and the like are at least to some extent inevitable, dynamic image enhancement schemes have been devised to integrate the mosaic patterning of fiber ends and non-conducting or partially conducting spaces resulting from fiber breakage and/or transmission variations between fibers.

The theory of dynamic scanning is explained in the Journal of the Optical Society of America, Vol. 47, No. 5, May, 1957, pages. 423-427 and also in the New York Academic Press, 1967, pages. 88-99. Heretofore, however, dynamic scanning has not had practical application in fiber optic industrial or medical endoscopy. The ungainliness complexity and costliness of prior art applications of dynamic scanning have for the most part outweighed and/or defeated their advantages. U.S. Pat. No. 3,016,785 is exemplary. Its complex and ungainly mechanism for effecting a break-up motion between opposite ends of a fiber bundle and optical images received and emitted thereby is not utilitarian in fiber optic endoscopes which must not be so distally or otherwise encumbered.

Simiarly, U.S. Pat. Nos. 3,217,588 and 3,217,589 synchronously nutate images at the receiving and output ends of fiber optic cables using motor driven geared mechanisms which are bulky and heavy, complex and costly and limited to use in areas other than those of industrial inspection or medical examining endoscopy where unencumbered instrumentation is required.

An object of the invention is to provide an image enhancement system for industrial and medical fiberscopes which is of simple construction, inexpensive and uniquely compact.

A further object is to accomplish high resolution of image and blemish suppression in industrial inspection and medical examining fiberscopes without encumberance of the fiberscope structure or function.

Other objects and advantages of the invention will become apparent from the following description.

SUMMARY OF THE INVENTION

The aforesaid and corrolary objectives are accomplished by positioning an alternating current solenoid adjacent each end of the optical fiber bundle of a fiberscope with axes of the solenoids coincident with the optical axis of the bundle. Forwardly of and centered with each solenoid is a light transmitting plate of preselected index of refraction which is centered within a ring-shaped transversely magnetized permanent magnet. Each magnet is, in turn, rendered pivotable about an axis perpendicular to the axis of the fiber bundle.

With both solenoids operating under identical phase, frequency and amplitude for identical harmonic oscillation of the plates about their pivot axes, images received by one plate, transmitted through the fiber bundle, and emitted through the other plate are caused to sweep in synchronism back and forth across the fiber bundle an amount given by the optical parameters of the plates and sweep angle. Sweep directions are made to correspond at opposite ends of the fiber bundle by rotationable adjustment of one bundle end relative to the other.

Details of the invention will become more readily apparent from the following description when taken in conjunction with the accompanying drawings.

IN THE DRAWINGS

FIG. 1 is a partially cross-sectioned diagrammatic illustration of a preferred embodiment of the invention; and FIG. 2 is a view taken from the position of line 2—2 in FIG. 1 and looking in the direction of its arrows.

DESCRIPTION OF THE PREFERRED EMBODIMENTS

Fiberscope 10 (FIG. 1) has been shown in diagrammatic form for ease and clarity of illustration of principles of the invention. The illustrated components of the fiberscope are intended to be ultimately supported and sheathed in conventional fashion, details of which will not be dealt with herein since they are clearly within the skill of the artisan. Those interested in such details, however, may refer to U.S. Pat. No. 3,913,568. This patent is exemplary of one form of fiber optic endoscope to which the present invention is applicable but in no sense restricted.

In FIG. 1 there is illustrated the basic fiberscope structure, i.e. flexible bundle 12 of light conducting fibers 14 having image receiving and emitting faces 16 and 18 respectively. Faces 16 and 18, each comprise a mosaic of ends of fibers 14 and are traditionally identically geometrically patterned. Images of objects appearing forwardly of fiberscope 10, e.g. arrow 20, are focused upon receiving face 16 by a suitable objective lens system 22 and transmitted through bundle 12 by the well known principles of total internal reflection to emitting face 18 where they may be photographed or viewed through eyepiece lenses 24 with eye 26.

In matters of enhancing images to be photographed or viewed upon face 18 (i.e. improving their resolution by suppressing blemishing resulting from spacings between fibers 14, fiber breakage, foreign matter inclusions and/or variations of transmission between fibers), dynamic scanning of the fiber bundle image receiving and emitting faces is accomplished as follows:

AC solenoid 28 is fitted coaxially over the distal end of fiber bundle 12 adjacent image receiving face 16 substantially as illustrated. It is contemplated that solenoid 28 be cemented or otherwise fixed thereinplace. Forwardly of face 16 and solenoid 28, ring-shaped permanent magnet 30 is pivotally mounted upon an axis 32 (FIG. 2) extending perpendicularly through axis 34 (FIG. 1) of fiber bundle 12. Magnet 30 is provided with a diametral, i.e. transverse, magnetization as illustrated with the symbols N and S in FIGS. 1 and 2. The pivotal support for magnet 30 preferably comprises jeweled bearings 36 which receive fixed pivot pins 38. Pins 38 are anchored in the fiberscope supporting structure 40, a fragmentary portion of which is shown only in FIG. 2. This supporting structure not being a critical part of the present invention has not been shown in detail and it should be understood that any conventional fiberscope supporting structure such as that of U.S. Pat. No. 3,913,568 may be used and/or modified with ordinary skill to suit the aforesaid purpose.

With solenoid 28 deenergized, magnet 30 is held parallel to face 16 of bundle 12 by springs 42. These springs, however, permit a tilting of magnet 30 back and forth as illustrated by dot dash outline relative to fiber bundle face 16 when north and south poles of the magnet are alternately electrically attracted to correspondingly opposite portions of AC solenoid 28, i.e. when the solenoid is energized. It is to be understood that other means such as soft foam rubber pads or their equivalents may be substituted for springs 42. Thus, magnet 30 may be driven in harmonic oscillation about its axis 32 at a frequency corresponding to that supplied to leads 44 of the solenoid.

Fixedly mounted within magnet 30 is plane parallel optical plate 46 through which image forming light focused upon face 16 of fiber bundle 12 is transmitted. Oscillation of magnet 30 carrying plate 46 causes the image of an object focused upon face 16 to sweep back and forth across the fiber bundle an amount given by the optical parameters of the plate and the sweep angle. For example, a plate 46 of strontium titanate having a refractive index of 2.4 and thickness of 1.5 mm with sweep angle of approximately 20° produces a total image sweep of 0.58 mm. This, it has been determined through experimentation, is more than adequate for optimum image enhancement and blemish suppression. In fact, adequate image enhancement can be accomplished with a plate 46 of clear glass having the same thickness and sweep angle and refractive index of only 1.8. This will produce a total image sweep of approximately 0.44 mm.

The system of the invention additionally comprises at the opposite or proximal end of fiberscope 10, a solenoid 28a, magnet 30a, plate 46a and springs 42a of identical structure to parts 28, 30, 46 and 42 already described. With pivot axes 32 and 32a of plates 30 and 30a respectively identically oriented by rotating one end of fiber bundle 12 about its axis relative to the other end as needed and both solenoids 28 and 28a operating with the same phase, frequency and amplitude, identical sweeps of incident and emitted images at faces 16 and 18 respectively occur and precise image enhancement with blemish suppression results. Identical phase and frequency may be easily conventionally obtained by driving both solenoids 28 and 28a from the same basic AC (e.g. 60 Hertz) power source and matching the amplitudes by simply adjusting the voltage (or current) supplied to either or both solenoids.

Those skilled in the art will readily appreciate that there are various other forms and adaptations of the invention which may be made to suit particular requirements. Accordingly, the foregoing illustrations are not to be interpreted as restrictive of the invention beyond that necessitated by the following claims.

I claim:

1. A dynamic image enhancement system for a bundle of optical fibers having image receiving and image emitting opposite end faces, said system comprising:
   an alternating current solenoid adjacent each of said opposite end faces of said bundle;
   a pivotable permanent magnet in spaced juxtaposition with each of said solenoids, said magnets each having transverse north and south pole magnetization and a pivot axis extending perpendicularly to the direction of said magnetization;
   means for supporting and permitting pivoting of each of said magnets about said pivot axis; and
   a plane parallel transmitting plate affixed to each of said magnets between respective poles thereof; whereby
   simultaneous electrical alternating current energization of said solenoids will produce harmonic back and forth pivoting oscillation of said magnets and the corresponding image transmitting plates with enhancement of images focused upon said image receiving face of said bundle of fibers through its adjacent transmitting plate and viewed upon said image emitting face of said bundle through its adjacent transmitting plate.

2. A dynamic image enhancement system according to claim 1 wherein said bundle of optical fibers is relatively long, slender and flexible intermediately of its length and;
   said solenoids each encompass said bundle;
   said magnets having transverse magnetization are of ring-like configuration; and
   said pivot axes of said magnets each right-angularly interesect the axis of said bundle of fibers.

3. A dynamic image enhancement system according to claim 2 including means for resiliently urging each of said magnets to a parallel orientation with their respectively adjacent fiber bundle faces.

4. A dynamic image enhancement system according to claim 3 wherein said urging of said magnets to said parallel orientation is effected with spring means.

5. A dynamic image enhancement system according to claim 1 wherein said image transmitting plates are of substantially identical refractive index and thickness.

6. A dynamic image enhancement system according to claim 5 wherein each of said solenoids and pivotable permanent magnets are of substantially identical construction.

* * * * *